Jan. 28, 1958 R. S. WEBSTER 2,821,428
VERTICALLY TELESCOPING TRUCK BODY
Filed April 7, 1955 3 Sheets-Sheet 1
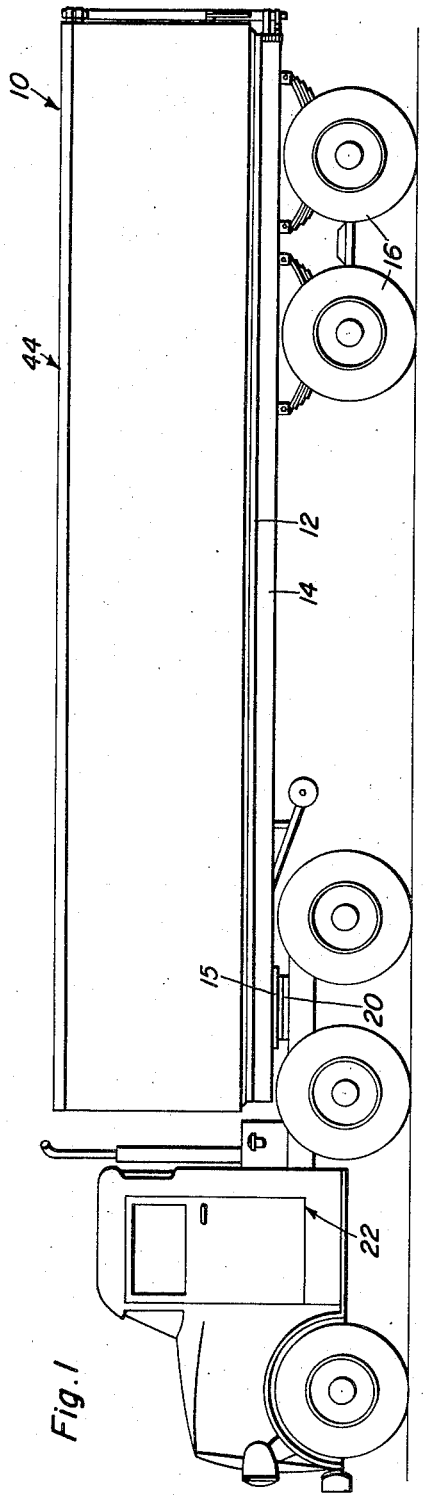
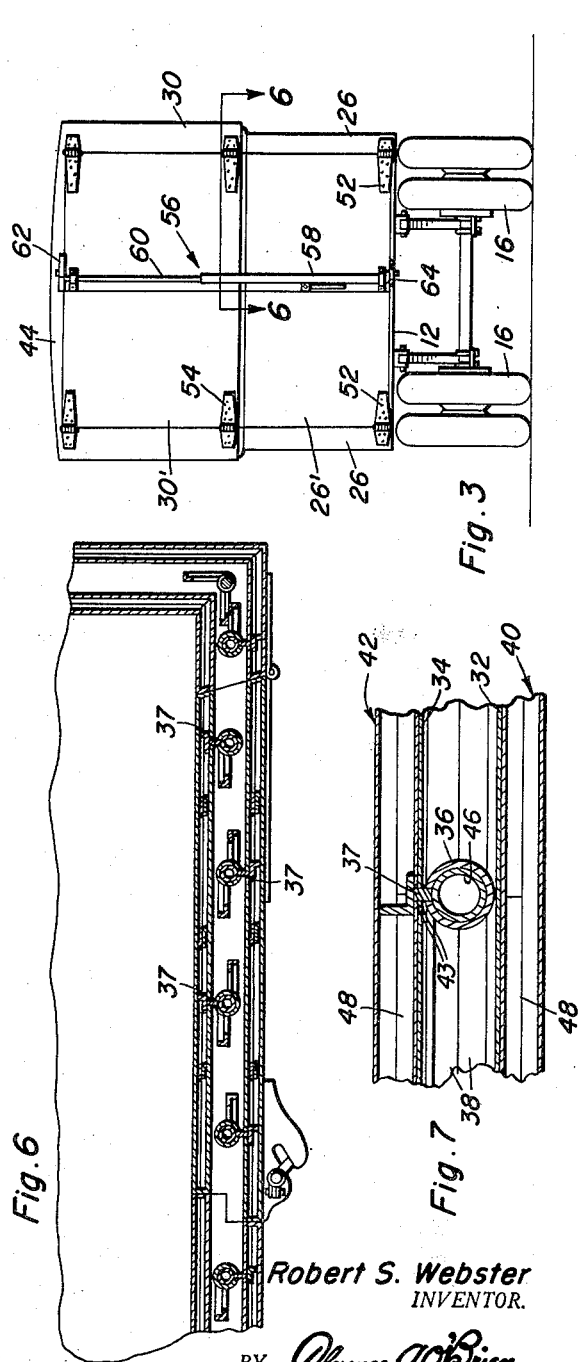
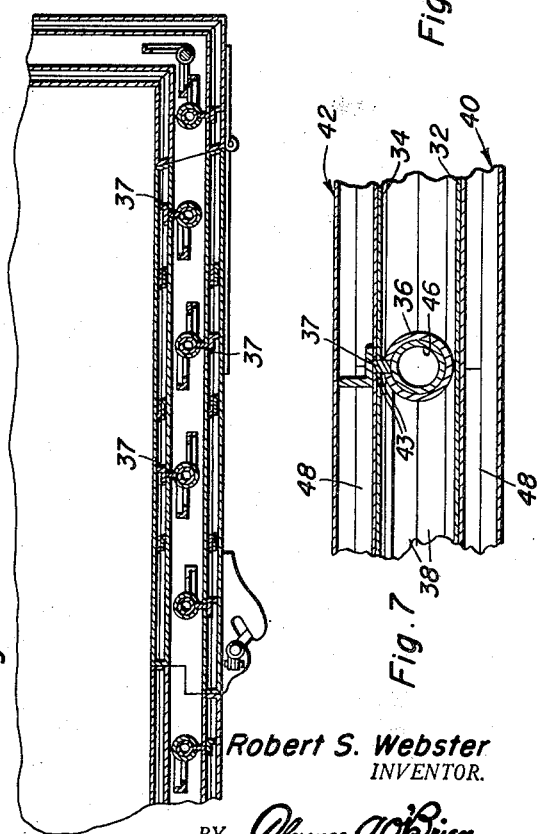
Robert S. Webster
INVENTOR.

Jan. 28, 1958 R. S. WEBSTER 2,821,428
VERTICALLY TELESCOPING TRUCK BODY
Filed April 7, 1955 3 Sheets-Sheet 2
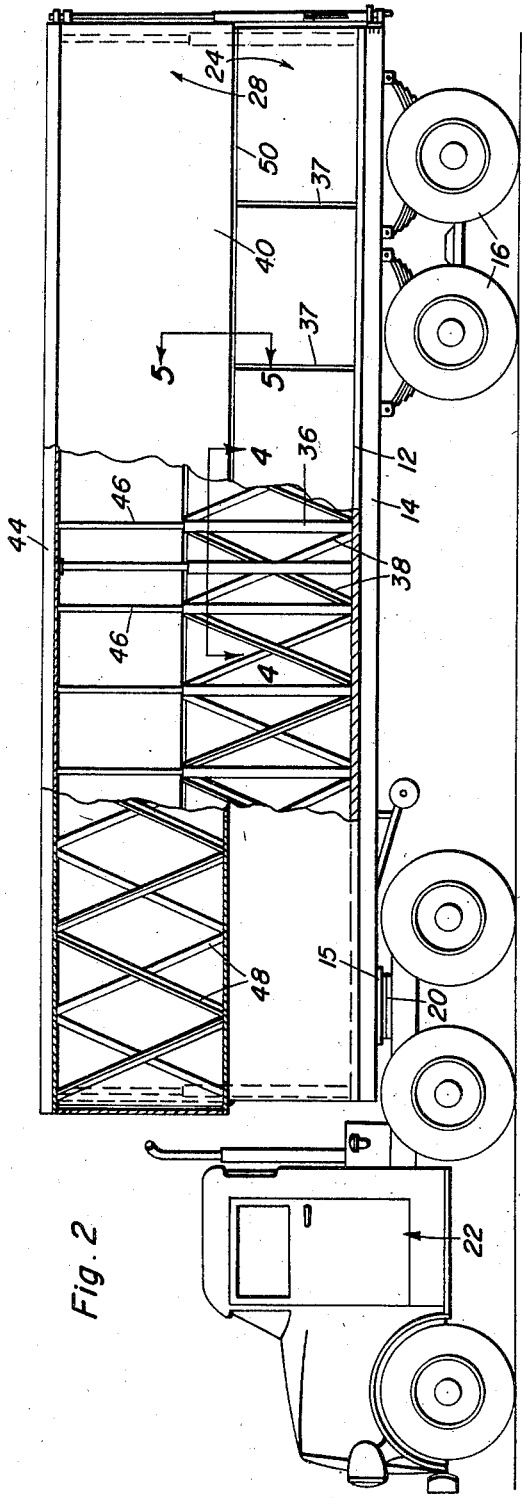
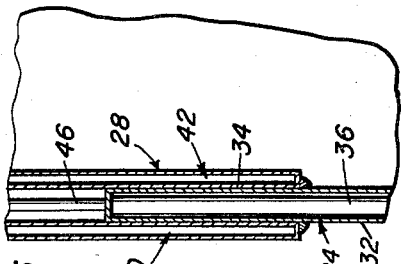
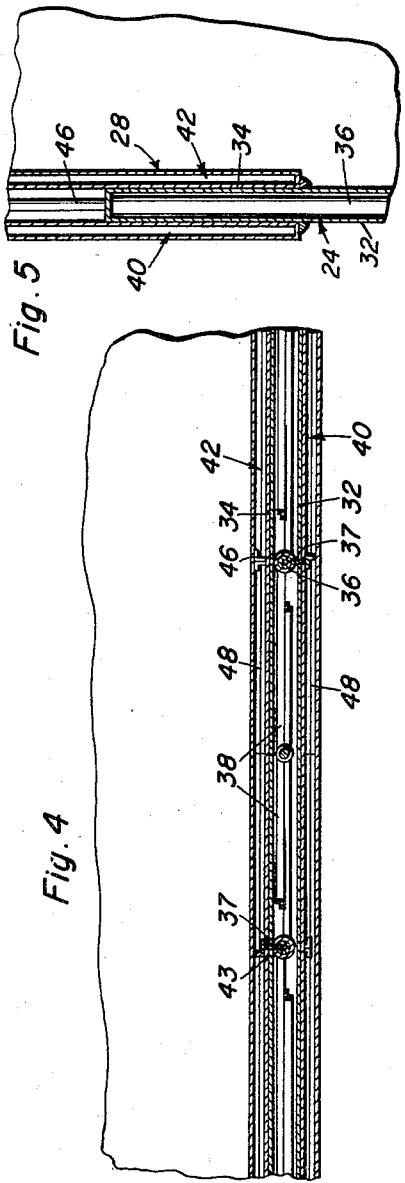
Robert S. Webster
INVENTOR.
BY
Attorneys Jan. 28, 1958  R. S. WEBSTER  2,821,428
VERTICALLY TELESCOPING TRUCK BODY
Filed April 7, 1955  3 Sheets-Sheet 3
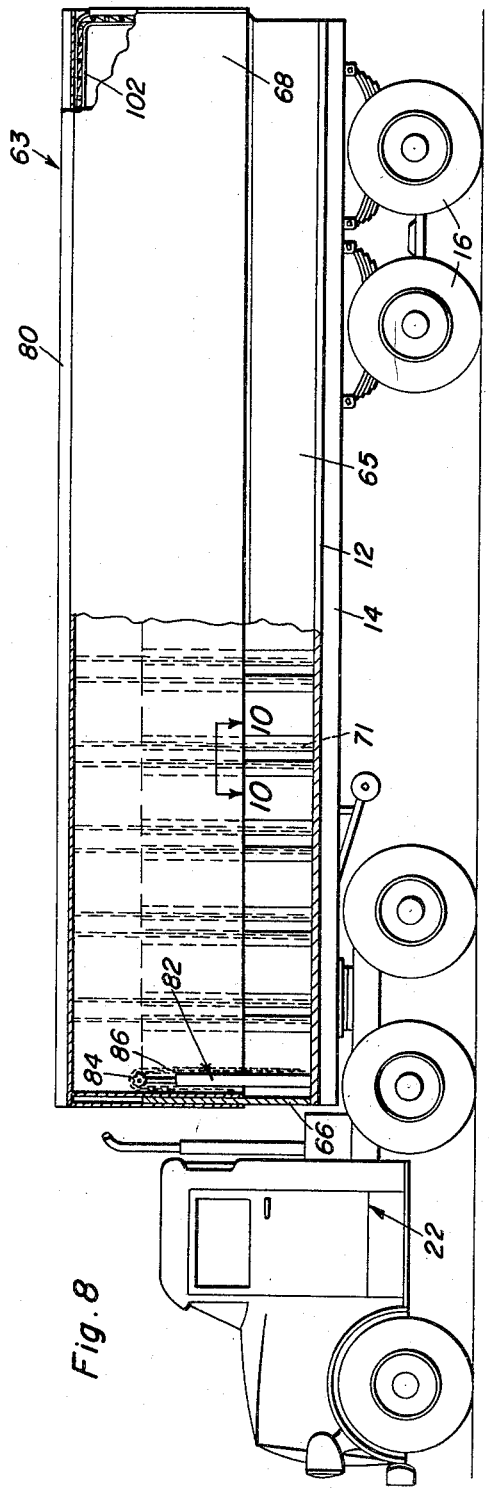
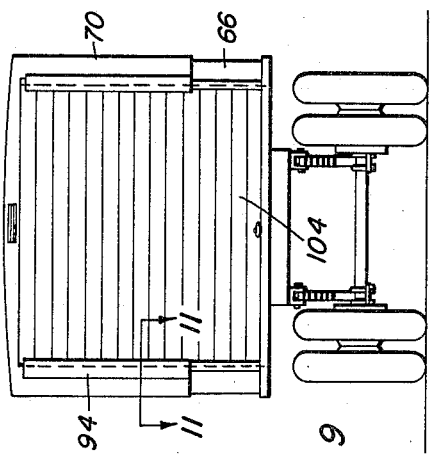
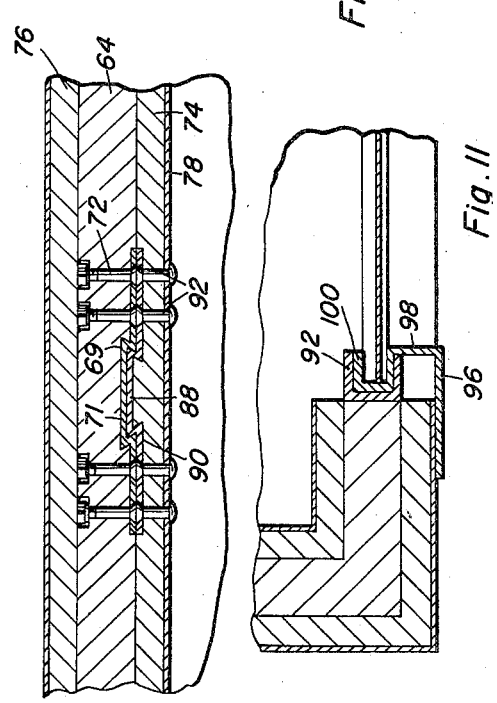
Robert S. Webster
INVENTOR.

United States Patent Office 2,821,428
Patented Jan. 28, 1958

2,821,428
VERTICALLY TELESCOPING TRUCK BODY

Robert S. Webster, Rhinelander, Wis., assignor of one-third to Forest R. Wincentsen, Rhinelander, Wis., and one-third to Robert A. Burns, Wakefield, Mich.

Application April 7, 1955, Serial No. 499,961

4 Claims. (Cl. 296—26)

The present invention relates to truck bodies, and more particularly relates to trailer bodies and the like.

The primary object of the invention is to provide a telescopic truck body whereby the over-all height of the truck body may be extended or reduced as desired or necessitated for road clearance, load capacity, to decrease refrigeration and heating costs, to lower the center of gravity and to reduce head winds.

Basically, the invention is to provide an enclosed trailer body of greatly increased versatility of those trailer bodies presently in use in that the trailer body of the present invention is designed to vary the over-all height of the body in response to load conditions and road conditions.

It is an object of the invention to provide a truck body construction wherein the side and end panels of the body are vertically extensible and guidingly attached to one another to control the vertical extensibility of the upper and lower panel sections of the body with respect to one another.

A further object of the invention is in the provision of vertically extensible side and end panels in a truck body wherein the hoisting means for the extensible sections is carried within the sections themselves and operable from the hydraulic system of the towing vehicle for the body.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a trailer body and towing vehicle therefor with the trailer body being shown in collapsed position wherein the over-all height of the body is reduced to a minimum;

Figure 2 is a side elevational view of the trailer body of the present invention and its towing vehicle with the trailer body being shown in its extended position with parts of the side walls of the body being broken away for clarity of detail and showing the interior construction of the extensible body sections;

Figure 3 is a rear end elevational view of the trailer body in its extended position disclosing the doors on the end for gaining access to the interior of the body;

Figure 4 is a cross-sectional view taken through one of the sides of the body taken substantially along the plane of section line 4—4 of Figure 2;

Figure 5 is a longitudinal cross-sectional view taken substantially along the plane of section line 5—5 of Figure 2;

Figure 6 is a transverse cross-sectional view taken substantially along the plane of section line 6—6 of Figure 3 disclosing the door construction of the body;

Figure 7 is an enlarged detail view in cross-section of a portion of the body;

Figure 8 is a side elevational view of a modified vertically extensible trailer body construction of the present invention with certain parts being broken away for clarity of detail of the construction of the extensible body sections;

Figure 9 is a rear end elevational view of the trailer body of Figure 8;

Figure 10 is a cross-sectional view taken substantially along the plane of section line 10—10 of Figure 8; and Figure 11 is a transverse cross-sectional view taken substantially along the plane of section line 11—11 of Figure 9.

Referring now to the drawings in detail, in Figures 1–7 is disclosed a heavy duty vertically telescopic trailer body 10 comprising an elongated deck 12 mounted on frame 14 and carried by supporting wheels 16. The forward end of the frame 14 is provided with a conventional fifth wheel 15 carried on a turntable 20 which is attached to a towing vehicle 22 for the trailer body.

In general, the vertically telescopic truck body 10 comprises lower side and end panel sections 24 and 26, respectively, and upper side and end panel sections 28 and 30, respectively.

The lower panel sections 24 and 26 are composed of hollow wall sections having spaced outer and inner wall facings 32 and 34. Vertically extending hollow posts 36 are mounted on the deck 12 and extend upwardly between the wall facings 32 and 34 of the lower wall sections 24 and 26 and are secured at diametrically opposite sides thereof to the inner surfaces of the wall facings. Reinforcing truss members 38 extend between the hollow post sections 36 and interconnect these posts to one another thereby stiffening and reinforcing the hollow wall panels forming the lower side and end sections 24 and 26 of the body.

The upper wall sections 28 and 30 comprise outer and inner hollow panels 40 and 42 which are suitably spaced from one another. A roof 44 extends over the top of the body and interconnects the upper edges of the outer and inner hollow wall panels 40 and 42 of the upper wall sections 28 and 30 to one another. Extensible post sections 46 slidably telescope within the hollow posts 36 and extend upwardly within the space formed between the outer and inner hollow wall panel sections 40 and 42 of the upper wall sections 28 and 30, respectively.

To guidingly attach the upper and lower panel sections 24 and 28, the posts 36 are provided with longitudinally extending radially projecting guide strips 37 which project alternately through the respective outer and inner facings 32 and 34 of the lower section 24.

The inner panels 42 of the upper section 28 are provided with vertically extending slots 43 on the panels thereof abutting the lower section wall facings. Guide strips 37 are slidably engaged in slots 43.

Reinforcing truss members 48 extend between the wall facings of the outer and inner hollow wall panel sections 40 and 42 to stiffen and reinforce the same.

The hollow wall panels 40 and 42 of the upper wall sections 28 and 30 telescopically straddle the lower wall sections 24 and 26 of the trailer body. The lower edge portions of the upper wall sections 28 and 30, both the outer and inner panels 40 and 42 thereof, are provided with resilient, rubber beads or the like 50 which sealingly engage the wall facings 32 and 34 of the lower wall sections 24 and 26 to insulatingly seal the space between these telescoping sections against the ingress of dirt, grease, air and the like.

Conveniently, the corner extensible posts formed from the hollow post sections 36 and 46 constitute fluid operated cylinder and piston assemblies which are adapted to be connected to the hydraulic system of the towing vehicle whereby upon the application of fluid pressure thereto, the upper body sections 28 and 30 of the trailer may be raised relative to the lower body sections 24 and 26 thereby to increase the over-all height of the trailer body from the collapsed position of Figure 1 to the fully extended position of Figure 2 or any position in between these two positions. The degree of extension is, of course, dependent upon the load to be carried, the type of roads and underpasses to be contended with on the route of the truck and other factors of economy and safety which may be necessitated or desirable.

The rear end of the truck body 10 is provided with hinged upper and lower door sections 26' and 30'; the lower door section 26' is composed of a pair of hollow wall panels of the same construction as the side panels 24 of the truck body which are hinged at their edges adjacent their connection to the end panels 26 of the truck by means of the conventional strap hinges 52. In these lower door sections 26', however, the posts 36 may be eliminated, the reinforcing truss members 38 being however retained. If desired, however, posts 36 may be included as shown and mounted on the bottoms of the panels themselves rather than on the truck deck so as not to interfere with the working space as the door sections are opened.

The upper door sections 30' are formed in the same manner as the upper side wall sections 28 of the truck body, again with the exception that the extensible post sections 46 may be eliminated, the truss members 48 within the hollow wall panels forming the upper door section 30' being however retained. Here again, if desired, the extensible sections 46 from the posts 36 may be retained as shown if the posts 36 are retained in the lower door sections. Strap hinges 54 secure the edges of the upper door panels 30' to the opposing side edges of the upper wall section end panels 30 of the truck body. With this construction, as the truck body is collapsed, the doors may be opened and closed at any position on the truck body.

To latch the upper and lower door sections 26' and 30' to one another, an elongated extensible rod 56 is provided consisting of a lower tubular section 58 and an upper extensible section 60 slidably telescoping therein and projecting thereabove. The upper and lower ends of the latching rod 56 are suitably seated in latch structures or the like 62 and 64, attached respectively to the rear edge of the roof 44 and the deck 12 of the body.

In the modified vertically telescoping truck body designated by the numeral 63 in its entirety shown in Figures 8–11, there is again shown the trailer body frame 14, trailer deck 12 and suporting wheels 16, the body being suitably attached to a towing vehicle 22.

The side and end walls of the trailer body 63 are again vertically telescoping and consist of lower side and end wall sections 65 and 66, respectively, and upper side and end wall sections 68 and 70, respectively.

The lower side and end wall sections 65 and 66 are comprised of rigid solid panel members having vertically extending longitudinally spaced dove-tail grooves 69 therein. Reinforcing plates 71 are secured to the panels and have their outer edge portions lying flush with the panels and their inner edge portions being dove-tailed and received in the grooves 69 to protect the surfaces thereof. Suitable rivets or other fasteners 72 secure these plate sections 71 to the lower wall panels 65.

The upper wall sections 68 of the structure comprise spaced outer and inner solid panel sections 76 and 74, respectively, which may be suitably faced with aluminum facings 78 or the like. In this connection, the lower wall sections 65 may be likewise faced.

Roof 80 covering the body 63 rigidly interconnects the upper edge portions of the outer and inner panels 76 and 74 of the upper wall sections 68 to one another.

The outer and inner wall panels 76 and 74 of the upper wall section 68 straddle the lower wall sections 65 and 66 of the body and slidably telescope thereover so that the over-all height of the body may be raised or reduced as desired. At the corners of the body within the body are vertically extensible posts 82 which may constitute fluid operated cylinder and piston assemblies adapted to be actuated from the hydraulic system of the towing vehicle. To the upper ends of the extensible posts 82 are attached suitable guide sheaves 84 over which are entrained intermediate portions of cables or the like 86. One end of each of the cables 86 is attached adjacent the lower end of the extensible post 82 whereas the other end of the cable 86 is attached to the upper wall section 68 of the trailer body 63 so that upon extension of the post 82, the upper body section composed of the members 68 and 70 of the trailer body will be raised.

Formed on the surface of the outer wall panel 76 facing and adjacent to the outer wall surface of the lower wall sections 64 and 66 are vertically elongated projecting dove-tail lugs or tongues 88. Facing plates 90 encase the tongues and have their end sections lying flush with the surface of the panel 74 and suitably secured thereto by means of fasteners 92. The dove-tail tongues 88 are slidably received in the dove-tail grooves 69 so that the facing plates 90 ride against the facing plates 71 to guidingly extend and collapse the upper wall sections 68 and 70 relative to the lower wall sections 65 and 66 of the trailer body 63.

The rear end wall sections 66 and 70 of the truck body are cut away to provide a door opening for access to the interior of the body.

The opposing edges of the rear end sections 66 constituting the lower wall sections at the rear end of the body are provided with facing channels 92 which form track or guideways, as will be apparent from an examination of Figure 11.

The upper wall sections 70 have the outer panels thereof provided with longitudinal guide members 94 which are in the form of L-shaped bars, one leg 96 of which is attached directly to the exterior surface of the outer panel of the upper section 70 of the wall and the other leg 98 of which extends inwardly into the open space opening into the truck body. The free end portions of the legs 98 are in the form of reduced, facing channels which slide within the channels 92 formed on the lower sections 66 of the rear end of the truck body 63. These inwardly opening channels are designated by the numeral 100.

With this construction, it is obvious that even as the upper body sections 68, 70 of the truck are raised relative to the lower body sections 65, 66, that the channel guides formed by the members 92 and 100 will still be intact and will not interfere with the telescoping movement of the body.

At their upper ends, as will be noted in Figure 8, the track formed by the member 100 is curved inwardly under the roof 80 of the truck, as at 102, in a direction parallel with the deck 12 of the trailer body.

A transversely articulated door 104 is provided to close the opening in the rear end of the body, the side edge portions of this door being slidably received in the tracks formed by the channels 100 in the upwardly inwardly reverse curved portions 102.

By virtue of its transversely articulated construction, as the body of the truck is lowered, the transversely articulated panels of the door roll upwardly into the portion 102 of the trackway so that the height of the door is effectively reduced as the body is collapsed and effectively extended as the body is raised.

From the foregoing construction, it can be seen that there is provided in both forms of the invention a vertically telescoping truck-trailer body wherein the upper structure of the body can be lowered or elevated to the desired position by the operator of the towing vehicle through the conventional hydraulic system of the towing vehicle and wherein access to the body of the vehicle may be maintained in the conventional manner through rearwardly opening doors which do not interfere with the raising and lowering movement of the body. Further, in both of these forms of the invention, a conventional roof structure is provided of a rigid type which is rigidly connected to the body of the truck and necessitates no hinging or other connections to afford collapsing of the body.

Further, in the first form of the invention, it is clear that the hoists for hoisting the body are provided entirely within the side and end walls of the body, and in no way interfere with the loading or unloading of the vehicle, and by virtue of the relation to the body panels, are enclosed at all times. Further, by virtue of their positioning within the body panels themselves, the hoists may be selectively provided to afford uniform support for the body superstructure whereas weatherstripping between the upper and lower sections of the trailer bodies, this weather-stripping being set forth previously by the numeral 50, effectively seals the telescoping portions of the body with respect to one another to prevent the ingress of dust or water or other undesirable elements into the body.

The foregoing is considered as illustrative only of the principles of the invention. Further, since numerous modifications and changes will readily occur to those skilled in the art, it is not desired to limit the invention to the exact construction and operation as shown and described, and accordingly, all suitable modifications and equivalents may be resorted to, falling within the scope of the appended claims.

What is claimed as new is as follows:

1. A trailer comprising a wheeled body including a deck and vertical walls, said vertical walls including telescoping upper and lower sections, said wall sections being hollow, vertically telescoping posts extending through said upper and lower wall sections and operatively connecting said wall sections for vertically telescoping said sections, said posts being mounted on said deck and having the upper ends thereof secured to the upper edges of said upper sections, certain of said posts comprising fluid operated cylinder and piston assemblies for raising and lowering said upper wall sections, said upper wall sections comprising spaced outer and inner hollow wall panels straddling said lower sections, said wall panels having interior reinforcing members therein.

2. The combination of claim 1 wherein resilient border strips are secured to the lower edges of said upper wall sections sealingly engaging the exterior and interior wall surfaces of said lower wall sections.

3. A trailer comprising a wheeled body having a deck, vertical side and end walls, said side and end walls comprising upper and lower extensible sections for raising and lowering the height of the body, and means forming a door in one of said end walls adapted for opening and closing movement at any stage of extensibility of the extensible sections, said lower sections each comprising a hollow wall panel, said upper sections each comprising outer and inner spaced hollow wall panels straddling one of said lower sections, hollow, extensible posts mounted on said deck and extending upwardly between the wall facings of said lower section, means extending between and connecting the top edges of said upper section panels to one another, the upper ends of said posts being attached to said connecting means, certain of said posts comprising fluid operated cylinder and piston assemblies operable as hoists to raise and lower the body.

4. A trailer comprising a wheeled body having a deck, vertical side and end walls, said side and end walls comprising upper and lower extensible sections for raising and lowering the height of the body, and means forming a door in one of said end walls adapted for opening and closing movement at any stage of extensibility of the extensible sections, said lower sections each comprising a hollow wall panel, said upper sections each comprising outer and inner spaced hollow wall panels straddling one of said lower sections, hollow, extensible posts mounted on said deck and extending upwardly between the wall facings of said lower section, means extending between and connecting the top edges of said upper section panels to one another, the upper ends of said posts being attached to said connecting means, certain of said posts comprising fluid operated cylinder and piston assemblies operable as hoists to raise and lower the body, the lower portions of said posts having longitudinally extending radially projecting guide strips extending through said lower panel sections, said upper panel sections having vertical slots therein slidably receiving said guide strips.

References Cited in the file of this patent

UNITED STATES PATENTS

| | | |
|---|---|---|
| 507,123 | Havens | Oct. 24, 1893 |
| 1,167,539 | Walter | Jan. 11, 1916 |
| 1,852,984 | Smith | Apr. 5, 1932 |
| 1,964,894 | Rohne | July 3, 1934 |
| 2,168,062 | Davey | Aug. 1, 1939 |
| 2,168,069 | Miller | Aug. 1, 1939 |
| 2,343,261 | Marple | Mar. 7, 1944 |
| 2,561,921 | Guillot | July 24, 1951 |
| 2,744,781 | Black | May 8, 1956 |

FOREIGN PATENTS

| | | |
|---|---|---|
| 106,933 | Australia | Mar. 14, 1939 |
| 967,762 | France | Apr. 5, 1950 |
| 329,088 | Great Britain | May 15, 1930 |